United States Patent [19]

Müller

[11] 4,234,795

[45] Nov. 18, 1980

[54] APPARATUS FOR LOADING AND UNLOADING CONTAINERS FOR X-RAY FILM

[75] Inventor: Jürgen Müller, Munich, Fed. Rep. of Germany

[73] Assignee: Agfa-Gevaert AG, Münich, Fed. Rep. of Germany

[21] Appl. No.: 971,120

[22] Filed: Dec. 19, 1978

[30] Foreign Application Priority Data

Dec. 30, 1977 [DE] Fed. Rep. of Germany ....... 2758981

[51] Int. Cl.³ .............................................. G11B 1/00
[52] U.S. Cl. ................... 250/468; 250/471; 354/175; 354/275; 414/411; 414/419
[58] Field of Search ............... 250/468, 471, 475, 480, 250/481; 355/112; 354/175, 275; 414/403, 411, 419

[56] References Cited

U.S. PATENT DOCUMENTS

| 3,383,507 | 5/1968 | Brackett et al. | 250/477 |
| 3,888,587 | 6/1975 | Perl | 250/468 |
| 3,930,165 | 12/1975 | Robinson et al. | 250/480 |
| 3,971,470 | 7/1976 | White | 250/481 |
| 4,152,593 | 5/1979 | Schmidt et al. | 250/315 A |

FOREIGN PATENT DOCUMENTS

1497446  8/1970  Fed. Rep. of Germany .

Primary Examiner—Alfred E. Smith
Assistant Examiner—Thomas P. O'Hare
Attorney, Agent, or Firm—Peter K. Kontler

[57] ABSTRACT

Apparatus for removing exposed sheets of X-ray film from and for thereupon introducing unexposed sheets into cassettes of the type having two pivotally connected sections and a locking mechanism for the sections has a housing with a cylindrical chamber which communicates with an opening for insertion or withdrawal of locked cassettes. A drum-shaped carrier is sealingly received in the chamber and is rotatable between a first position in which the open end of a diametrically extending compartment therein registers with the opening of the housing to allow for insertion or removal of a cassette. A cassette which is introduced into the compartment is automatically unlocked and opened during movement of the carrier to a second angular position in which the exposed sheet leaves the cassette by gravity and the cassette remains open during movement of the carrier to a third position in which the cassette receives an unexposed sheet. The carrier is thereupon rotated back to the first position and the cassette is automatically closed and locked before the open end of the compartment begins to communicate with the opening.

10 Claims, 5 Drawing Figures

APPARATUS FOR LOADING AND UNLOADING CONTAINERS FOR X-RAY FILM

BACKGROUND OF THE INVENTION

The present invention relates to apparatus for introducing photosensitive material into and for removing photosensitive material from containers, particularly for unloading and loading cassettes for X-ray film. Still more particularly, the invention relates to improvements in apparatus wherein a container or cassette which contains a sheet or plate of exposed film is relieved of its contents and is thereupon recharged with a sheet or plate of unexposed film.

German Pat. No. 1,497,446 discloses an apparatus wherein a cassette which contains exposed X-ray film is inserted into a lighttight housing and is placed onto a tiltable table while the table is held in horizontal position. The table is thereupon tilted to one side, the cassette thereon is unlocked by a first unlocking device, and the film is allowed to leave its interior by gravity. The cassette is thereupon locked and the table is tilted in the opposite direction to a station where it is unlocked by a second unlocking device so that it can receive a sheet of unexposed film. In the next step, the table is tilted back to the horizontal position and the loaded and locked cassette is removed from the housing.

A drawback of the patented apparatus is that the removal of an exposed film and the insertion of an unexposed film take up a relatively long interval of time. Furthermore, the apparatus is complex because it must be equipped with two discrete unlocking mechanisms. Still further, the extent to which the cassette is opened is rather small so that a sheet of film therein is likely to be held against evacuation by gravity while the cassette is located at the evacuating station. The insertion of a fresh sheet at the loading station also presents problems. As a rule, such cassettes contain layers of foamed material which expands when the cassette is caused or allowed to open. Unless the angle between the pivotally connected sections of the cassette is very large (when the cassette is held in open position), the layer or layers of expansible foamed material will interfere with gravitational descent of an exposed sheet and/or with introduction of an unexposed sheet. It is desirable to evacuate exposed sheets by gravity because this simplifies the construction of the apparatus; on the other hand, the aforementioned layer or layers of foamed material often prevent gravitational descent of sheets from a slightly open cassette so that the exposed sheet is likely to be transported beyond the unloading station.

In a cassette which is used in a machine for making mammograms, the sheet of unexposed X-ray film must be inserted all the way into the interior of the cassette so that the front edge portion of the sheet can be placed as close to the chest of a patient as possible. This enables the X-ray machine to make images of entire breasts. Reference may be had to commonly owned copending application Ser. No. 832,884, filed Sept. 13, 1977, now U.S. Pat. No. 4,152,593, by Manfred Schmidt et al. This application discloses an imaging chamber wherein one edge of the film is located in immediate proximity of that portion of the chamber which is nearest to the body of the patient during radiographic examination of her breasts.

OBJECTS AND SUMMARY OF THE INVENTION

An object of the invention is to provide a novel and improved apparatus for loading and unloading containers for photosensitive material, especially flat cassettes for sheets of X-ray film, in such a way that an exposed sheet is invariably removed from the opened cassette at the evacuating station and that an unexposed sheet is invariably inserted in optimum position while the cassette dwells at or moves past the loading or filling station.

Another object of the invention is to provide an apparatus which can rapidly complete the evacuation of exposed photosensitive material and insertion of unexposed photosensitive material into containers for sheets of X-ray film or the like and which is simpler, more compact and less expensive than heretofore known apparatus.

A further object of the invention is to provide an apparatus which insures that a container therein is opened to the extent that is necessary to insure predictable removal and insertion of photosensitive material.

An additional object of the invention is to provide an apparatus wherein a single unlocking mechanism suffices to insure that the container remains open during travel to and at the evacuating and loading stations.

Another object of the invention is to provide an apparatus which can be used for loading and unloading of conventional cassettes for sheets of X-ray film or the like.

The invention is embodied in an apparatus for inserting photosensitive material into and for withdrawing such material from normally closed and locked containers, particularly for removing exposed sheets of X-ray film from and for introducing unexposed sheets of X-ray film into cassettes of the type wherein two sections are pivotally connected to each other by one or more hinges so that an opened cassette resembles a V-shaped body and a closed and locked cassette resembles a flat prismatic structure. The apparatus comprises a housing having an internal chamber and an opening which communicates with the chamber and serves for insertion and withdrawal of containers, a rotary carrier (e.g., a drum-shaped member) which is sealingly installed in the chamber and has a compartment with an open end which registers with the opening in a first angular position of the carrier so that a container can be inserted into or withdrawn from the compartment (e.g., by hand) when the carrier dwells in the first position, unlocking means for maintaining a container in the compartment in open position while the open end of the compartment is out of register with the opening, i.e., when the opening cannot admit light into the interior of the carrier, means for receiving photosensitive material from a container in the compartment in a second angular position of the carrier, and means for admitting photosensitive material into a container in the compartment in a third angular position of the carrier.

The apparatus preferably further comprises means (e.g., a shaft which can be rotated by hand or by a suitable prime mover) for rotating the carrier from the first position, to the second position, thereupon to the third position and back to the first position. Thus, when a container with an exposed film therein is inserted into the compartment, it is advanced first to the station where the exposed film is removed and thereupon to the station where it receives an unexposed film. The unlocking mechanism is preferably designed to automatically unlock and open a container in the compartment as soon as or shortly after the carrier leaves its first position (but invariably before the carrier reaches the second position) and to automatically close and allow or cause locking of the container before the carrier returns to the first position (but not before the carrier moves past the third position). The compartment is preferably dimensioned in such a way that it allows the container therein to open to the extent which is necessary to allow for unimpeded evacuation of an exposed film by gravity and for unimpeded insertion of an unexposed film so as to enable the loaded container to be held in an optimum position for the making of mammograms or the like.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
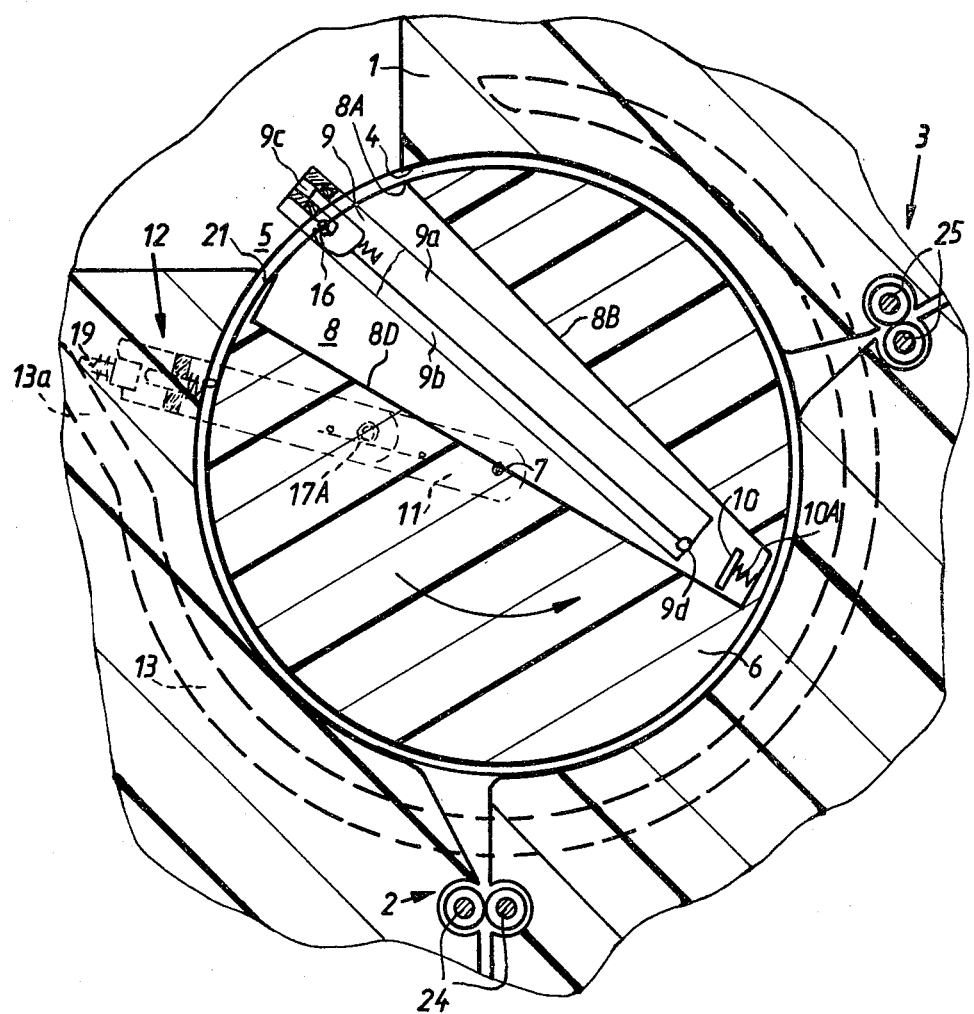
FIG. 1 is a fragmentary sectional view of an apparatus which embodies the invention, the carrier with a locked and closed container or cassette therein being shown in the first position in which the open end of its compartment registers with the opening of the housing.

Referring to FIG. 1, the improved apparatus comprises a housing 1 having a cylindrical internal chamber 4 for a rotary drum-shaped carrier 6 which is sealingly received in the housing 1. The carrier 6 has a substantially wedge-like cutout or compartment 8 which extends substantially diametrically thereof and has a relatively wide open end 8A which registers with an opening 5 of the housing 1 when the carrier 6 assumes a first angular position which is shown in FIG. 1. This enables an attendant or an automatic or semiautomatic mechanism (not shown) to insert a closed and locked container or cassette 9 into or to remove such cassette from the compartment 8. FIG. 1 shows the cassette 9 in partly inserted position; when fully inserted, the cassette 9 abuts against a yieldable stop 10 which is biased by a spring 10A and is installed in the deepmost portion of the compartment 8, i.e., in that portion which is remotest from the open end 8A.

Figure 2:
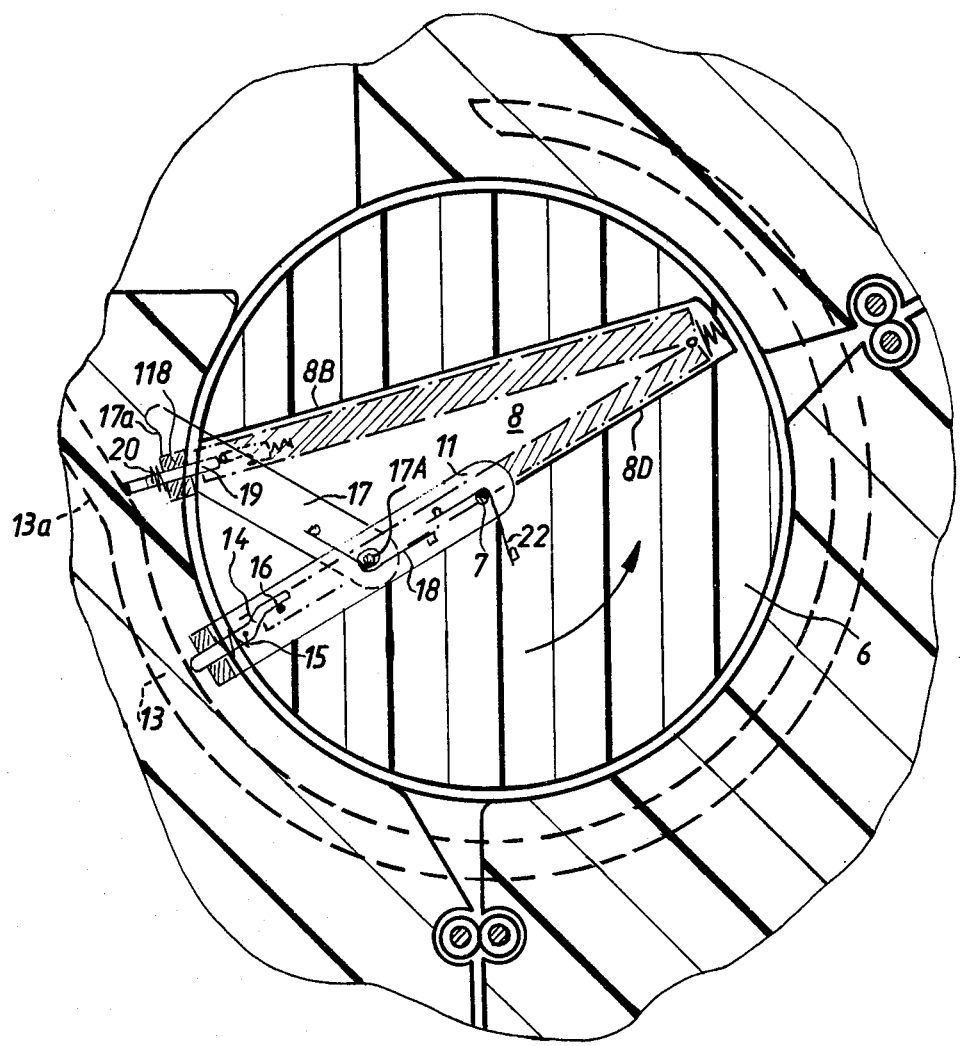
FIG. 2 is a similar sectional view, with the carrier shown between its first and second positions and with the cassette in its compartment in unlocked and open position.

The cassette 9 is of the type having two sections or panels 9a and 9b which are attached to each other by a hinge 9d so that the section 9a or 9b can pivot relative to the other section 9b or 9a between a closed position shown in FIG. 1 and an open position shown in FIG. 2. The dimensions of the compartment 8 are selected in such a way that it can accommodate a cassette 9 in its open position, namely, in a position in which the wedge-like gap between the sections 9a and 9b is sufficiently wide to allow for evacuation of an exposed sheet 23 of X-ray film (see FIG. 3) from the interior of the cassette or to permit introduction of an unexposed sheet 23 of X-ray film into the interior of the cassette 9 (see FIG. 4).

The opening 5 of the housing 1 and the compartment 8 of the carrier 6 extend in parallelism with the axis of the carrier 6. Such axis is defined by a shaft 7 which is journalled in the housing 1 and can be rotated, either by hand or by a suitable motor, to turn the carrier 6 in a counterclockwise direction, as viewed in the drawing, from the first position of FIG. 1, through an intermediate position which is shown in FIG. 2, to a second position shown in FIG. 3, thereupon to a third position which is shown in FIG. 4, to another intermediate position shown in FIG. 5, and back to the first position of FIG. 1. The carrier 6 need not be arrested in the intermediate positions of FIGS. 2 and 5.

FIG. 1 shows that the width of the open end 8A of the compartment 8 in the carrier 6 equals or approximates the width of the opening 5, as considered in the circumferential direction of the carrier 6. The open end 8A is formed in the periphery of the carrier 6 and the deepmost portion of the compartment 8 is also close to the periphery of the carrier 6 but at a locus which is remote from the open end 8A. The length of the carrier 6, as considered in the axial direction of the shaft 7, need not appreciably exceed the corresponding dimension of the compartment 8 and of a cassette 9. The angle between surfaces 8B and 8D which flank the compartment 8 is selected in such a way that the outer side of the section 9a of a properly inserted cassette 9 abuts against the surface 8B and the outer side of the section 9b abuts against the surface 8D whereby the gap between the sections 9a and 9b is sufficiently wide to allow for convenient withdrawal of an exposed sheet 23 or for full insertion of an unexposed sheet 23 between the sections 9a and 9b while the cassette 9 is held in the open position. As a rule, the inner side of the section 9a and/or 9b is coated with a layer of foamed plastic material which insures that the properly inserted sheet 23 is shielded from light when the cassette 9 is closed. Such foamed material expands when the cassette 9 is open, and the angle between the sections 9a and 9b in open position of the cassette 9 is sufficiently large to prevent the expanded foamed material from interfering with insertion or withdrawal of sheets 23.

Figure 3:
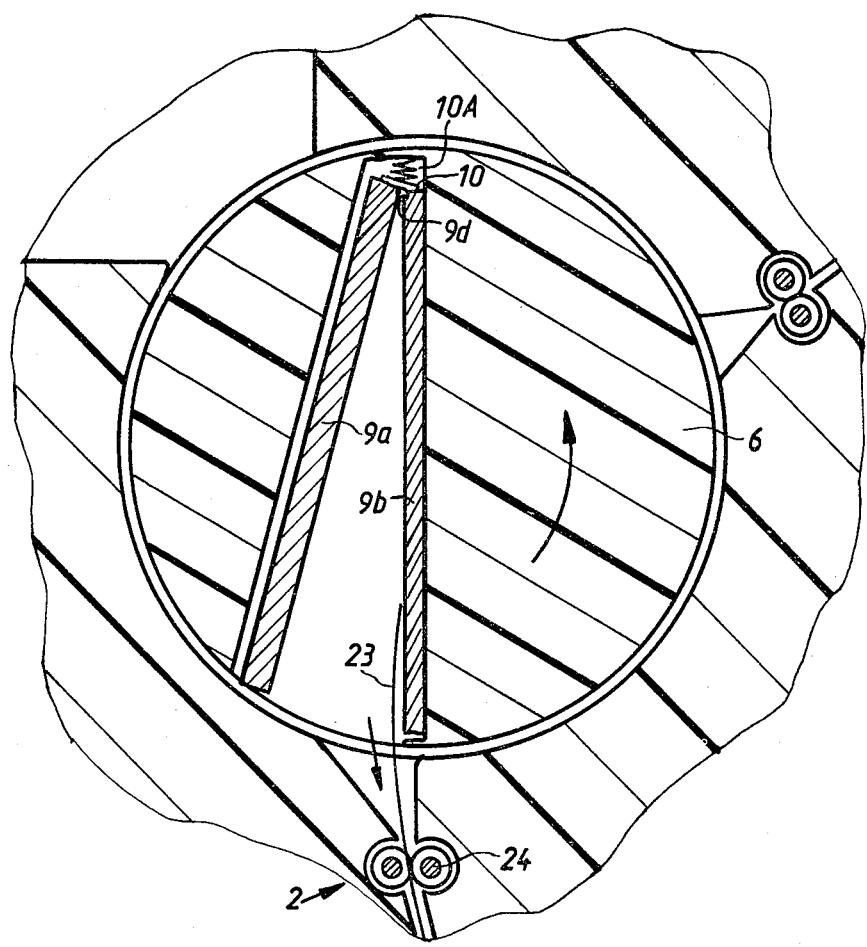
FIG. 3 is a similar sectional view but showing the carrier in the second position during evacuation of an exposed sheet of X-ray film from the cassette.
Figure 4:
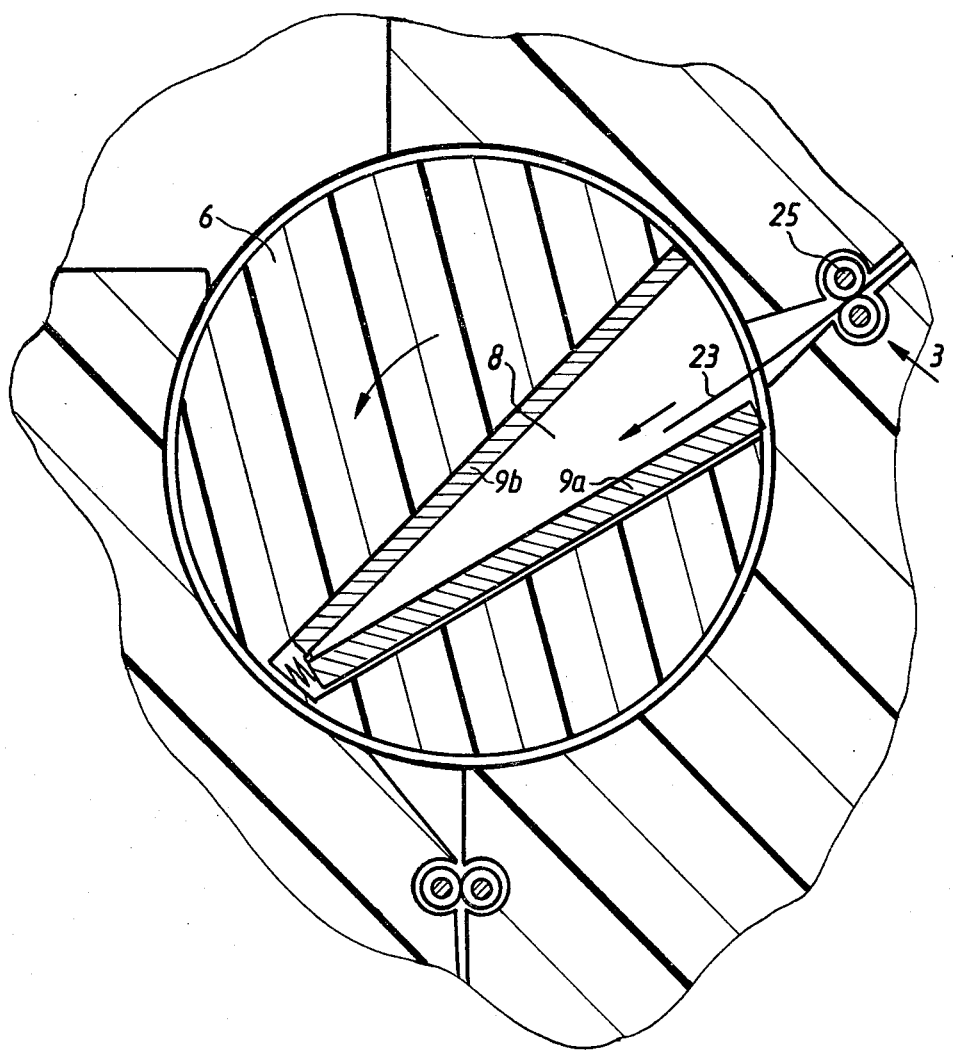
FIG. 4 is a similar sectional view but showing the carrier in the third position during introduction of an unexposed sheet of X-ray film into the cassette.

The housing 1 further contains a device 2 which receives an exposed sheet 23 when the shaft 7 is caused to move the carrier 6 to the second position which is shown in FIG. 3. The sheet 23 can descend by gravity to enter the nip of two driven advancing rolls 24 which transport the exposed sheet 23 to a developing or other processing station, not shown. The housing 1 also contains a device 3 which admits an unexposed sheet 23 into the open cassette 9 in the compartment 8 when the carrier 6 is caused to assume the third position which is shown in FIG. 4. The sheet 23 is admitted by two driven advancing rolls 25 which are journalled in the housing 1 and receive unexposed sheets 23 from a source of supply which is not shown in the drawing.

In the illustrated embodiment of the improved apparatus, the opening 5 is located at the ten o'clock position of the carrier 6, the device 2 is located at the six o'clock position so that an exposed sheet 23 can leave the cassette 9 by gravity, and the device 3 is located at the two o'clock position. As mentioned above, the carrier 6 rotates in a counterclockwise direction, as viewed in the drawing.

Figure 5:
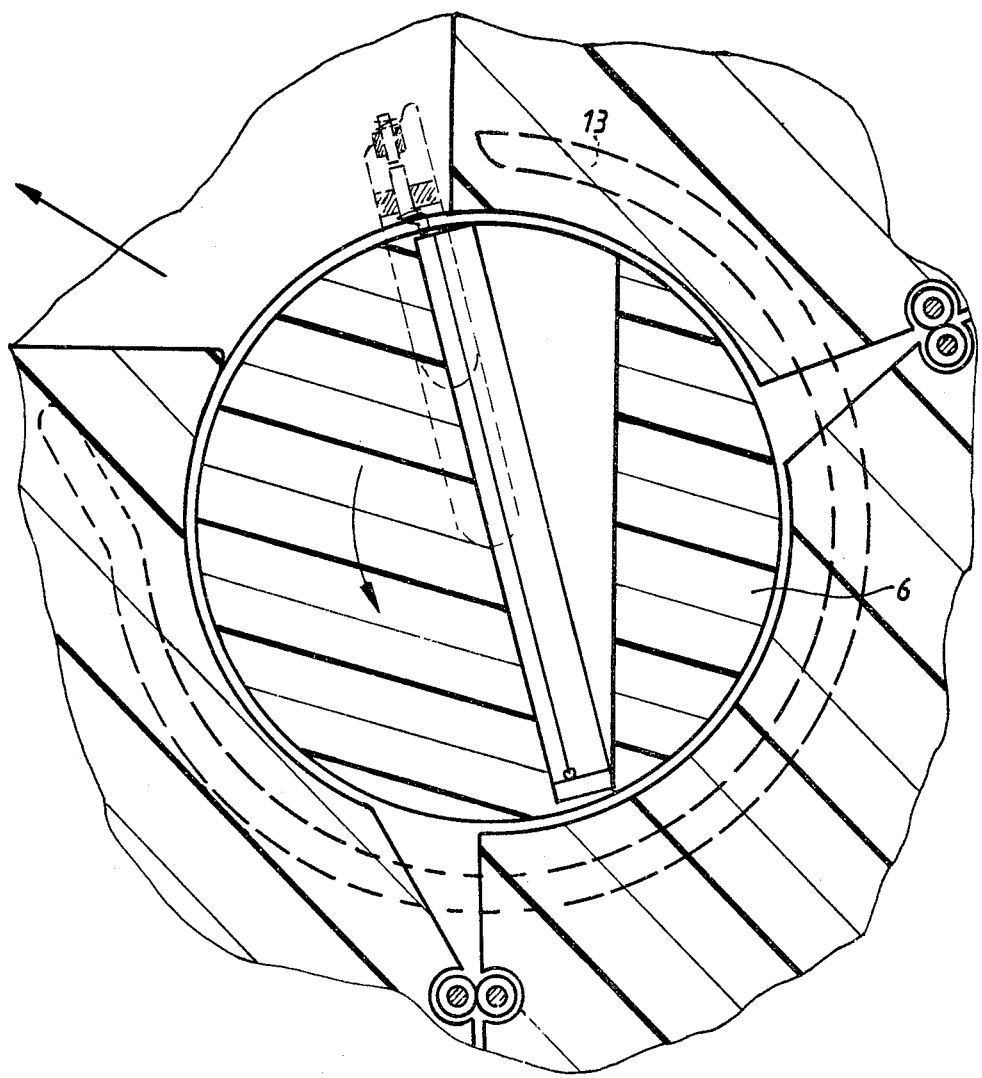
FIG. 5 is a similar sectional view but showing the carrier between the third and first positions subsequent to closing and locking of the freshly loaded cassette.

The apparatus further comprises an unlocking mechanism which serves to unlock a freshly inserted cassette 9 as soon as the open end 8A of the compartment 8 moves out of register with the opening 5 (so that the opening 5 cannot admit light into the compartment) and which thereupon maintains the cassette 9 in the compartment 8 in open position while the open end 8A of the compartment 8 moves from the first intermediate position of FIG. 2 to the second intermediate position of FIG. 5. This insures that the cassette 9 cannot be accidentally closed at an inopportune time during movement of the carrier 6 to and during dwell of the carrier 6 in the second and/or third position. The unlocking mechanism includes two levers 11 (only one shown) which are mounted on the shaft 7 at the opposite axial ends of the carrier 6. The unlocking mechanism further comprises two unlocking units 12 each mounted on the respective lever 11 and each movable past a discrete actuating device in the form of an arcuate cam or rail 13 one of which is adjacent to the path of movement of each of the levers 11 about the axis of the shaft 7. The cams 13 are stationary and are mounted in the housing 1 adjacent to the respective axial ends of the carrier 6.

The details of one of the units 12 are shown in FIG. 2. The outer end portion of the respective lever 11 carries a pin 14 which is movable therein radially of the carrier 6 and is biased outwardly by a helical spring 15 so that it engages the corresponding cam 13 when the carrier is rotated from the first position of FIG. 1 to the intermediate position of FIG. 2. The cam 13 then depresses the pin 14 radially inwardly against the opposition of the spring 15. The depressed pin 14 engages a pin 16 of the cassette 9 and thereby holds the section 9b of the cassette 9 against movement away from the surface 8D in the compartment 8. Thus, the section 9b of a cassette 9 in the compartment 8 is automatically held in a predetermined position in response to movement of the carrier 6 from the first position of FIG. 1 to the intermediate position of FIG. 2 because the depressed pin 14 prevents any changes in the position of the section 9b with respect to the carrier 6. Each cam 13 has an outwardly flaring front portion or ramp 13a which is adjacent to the opening 5 and insures gradual depression of the respective pin 14 on movement of the carrier 6 from the first position of FIG. 1.

A follower in the form of a second lever 17 is pivoted to the respective lever 11 by a pin 17A which is parallel to the axis of the shaft 7. The pin 17A is located substantially midway between the ends of the respective lever 11. A torsion spring 18 is provided to bias the lever 17 to a position of substantial parallelism with the corresponding lever 11 (see FIG. 1). The outer end portion of each lever 17 is provided with a cam face 17a which moves against the ramp 13a and thereupon against the concave side of the respective cam 13 when the carrier 6 is moved from the first position to the intermediate position of FIG. 2. The outer end portion of each follower lever 17 carries a rotary holder 118 which is adjacent to the corresponding cam face 17a and supports a reciprocable pin 19 which is biased by a helical spring 20 so that it tends to move radially of and away from the shaft 7. The pin 19 is displaced radially inwardly in response to engagement with the corresponding cam 13.

FIG. 1 further shows a motion transmitting projection or lobe 21 which is provided on the carrier 6 and serves to entrain the units 12 of the unlocking mechanism. FIG. 2 shows a torsion spring 22 which biases the respective lever 11 to a starting position when the carrier 6 is held in the first position in which the open end 8A of the compartment 8 registers with the opening 5.

The operation is as follows:

Referring to FIG. 1, the carrier 6 is held in the first position and a cassette 9 which is closed and locked and contains an exposed sheet 23 is in the process of entering the compartment 8 via opening 5 of the housing 1. When fully inserted, the cassette 9 abuts against and displaces the stop 10 against the opposition of the spring 10A. When the insertion of a closed and locked cassette 9 is completed, the shaft 7 is caused to rotate in a counterclockwise direction and to thereby move the carrier 6 toward the intermediate position of FIG. 2. The lobe 21 of the carrier 6 engages and moves the units 12 from the positions shown in FIG. 1 whereby the follower levers 17 remain in positions of parallelism with the respective levers 11 during the initial stage of angular movement of the carrier from the first position of FIG. 1. When the pins 19 strike against and are displaced by the ramps 13a of the respective cams 13, they are caused to move radially inwardly (toward the shaft 7) and enter into the sockets 9c (shown in FIG. 1) of the section 9a of the cassette 9 in the compartment 8. This results in unlocking of the cassette 9 in a manner known per se. Reference may be had to U.S. Pat. No. 3,383,507 granted May 14, 1968 to Brackett et al. or to U.S. Pat. No. 3,930,165 granted Dec. 30, 1975 to Robinson et al. At the same time, the pin 14 of the lever 11 engages the pin 16 of the section 9b of the cassette 9. As the carrier 6 continues to rotate, the lobe 21 continues to entrain the levers 11 whereby the levers 17 pivot relative to the associated levers 11 because the cam faces 17a of the levers 17 engage the corresponding cams 13. The levers 17 engage the section 9a and pivot the latter to the open position of FIG. 2, i.e., the outer side of the section 9a abuts against the surface 8B in the compartment 8 and is held in such position so that the cassette 9 remains open.

The carrier 6 thereupon advances to the second angular position of FIG. 3 in which the exposed sheet 23 is free to leave the interior of the opened cassette 9 by gravity and to enter the nip of the rotating advancing rolls 24 of the receiving device 2 to be transported to a developing or another processing station. The speed at which the rolls 24 are rotated can be such that the exposed sheet 23 can be withdrawn from the opened cassette 9 even if the carrier 6 continues to rotate past and beyond the receiving device 2.

The carrier 6 is thereupon moved to the third position of FIG. 4 to receive an unexposed sheet 23 from the advancing rolls 25 of the admitting device 3. Such admission of an unexposed sheet 23, too, can take place while the carrier 6 continues to rotate in a counterclockwise direction.

As the carrier 6 rotates beyond the third position of FIG. 4, the unlocking mechanism moves beyond the cams 13. This results in disengagement of the pins 14 from the respective pins 16 so that the section 9b of the cassette 9 in the compartment 8 is released. The springs 18 return the follower levers 17 into positions of substantial parallelism with the respective levers 11 which results in movement of the section 9a toward the section 9b, i.e., the cassette 9 (with an unexposed sheet 23 therein) is closed and locked. Such locking takes place when the pins 19 move beyond the cams 13. This is shown in FIG. 5. The carrier 6 continues to rotate and moves the open end 8A of its compartment 8 into register with the opening 5 so that the freshly loaded and locked cassette 9 can be removed from the compartment, either by hand or by automatic or semiautomatic withdrawing means.

The illustrated unlocking mechanism constitutes but one form of means which can be used in the improved apparatus to effect opening of cassettes in the compartment 8 and to thereupon insure that a properly inserted cassette remains open during travel past the stations which accommodate the devices 2 and 3. For example, the sections 9a and 9b of the cassette 9 may consist of or may carry inserts of magnetizable material which are attracted by magnets in the surfaces 8B and 8D as soon as the cams 13 or other suitable means cause a locking pin of a properly inserted cassette to assume its inoperative position (after the open end of the compartment 8 has advanced beyond and is sealed from the opening 5). In such apparatus, the housing preferably supports a stationary or mobile cam which automatically closes and locks or allows the locking of a cassette in the compartment 8 before the latter begins to communicate with the opening 5, i.e., while the carrier 6 moves from the position of FIG. 4 back to the position of FIG. 1. Still further, it is possible to employ jaws, claws or analogous gripping or retaining means which hold the sections 9a and 9b of a cassette in their open positions during movement of the cassette past the devices 2 and 3. All that counts is to insure that the cassette in the compartment 8 is automatically unlocked and is held in open position at least during movement of the open end 8A past the devices 2 and 3.

An important advantage of the improved apparatus is that the dimensions of the compartment 8 can be readily selected in such a way that the cassette 9 is opened to the extent which invariably suffices to insure gravitational descent of an exposed sheet 23 when the open end 8A of the compartment is adjacent to the device 2, and that the advancing rolls 25 of the device 3 can readily introduce an unexposed sheet 23 to the extent which is necessary for the making of mammograms in the apparatus which is disclosed, for example, in the aforementioned copending application Ser. No. 832,884, now U.S. Pat No. 4,152,593. Another important advantage of the improved apparatus is that it can accept and manipulate conventional cassettes for sheets of X-ray film or dielectric receptor sheets and that a single unlocking mechanism suffices to insure that a properly inserted cassette remains open at least while the open end 8A of the compartment 8 is in the region of the devices 2 and 3. At the same time, such single unlocking mechanism insures that the cassette is invariably locked and sealed against entry of light while the open end 8A is in at least partial register with the opening 5 of the housing 1. A cassette which contains exposed film can be inserted into the compartment 8 with one hand without resorting to special devices which shield the cassette against entry of light, and a freshly loaded cassette can be removed with one hand. Proper sealing against entry of light is achieved in that the cassette is locked during its insertion into or during its withdrawal from the carrier 6 and in that the carrier 6 automatically seals the opening 5 from the compartment 8 except when a locked cassette is ready to be removed from the apparatus or when a locked cassette is to be inserted into the compartment 8.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

I claim:

1. Apparatus for inserting photosensitive material into and for withdrawing such material from normally locked and closed containers, particularly for removing exposed sheets of X-ray film from and for introducing unexposed sheets of X-ray film into cassettes, comprising a housing having an internal chamber and an opening for insertion and withdrawal of containers, said opening communicating with said chamber; a rotary carrier sealingly installed in said chamber for rotation from a first to a second and a third angular position and then again to said first angular position and having a compartment with an open end which registers with said opening in said first angular position of said carrier so that a container can be inserted into or withdrawn from said compartment when said carrier assumes said first position; unlocking means for maintaining a container in said compartment in its open position only while said open end is so completely out of register with said opening that outside light reaching the latter is prevented from entering said compartment through said open end thereof; means for receiving photosensitive material from a container in said compartment in said second angular position of said carrier; and means for admitting photosensitive material into a container in said compartment in said third angular position of said carrier.

2. Apparatus as defined in claim 1, further comprising means for rotating said carrier in one and the same sense from said first position to said second position, thereupon to said third position and further again to said first position.

3. Apparatus as defined in claim 1 for inserting and withdrawing photosensitive material from containers of the type having interconnected sections at least one of which is movable with respect to the other section between open and closed positions, wherein said compartment is dimensioned to permit movements of the one section of a container therein between open and closed positions and said unlocking means comprises means for moving said one section to and for maintaining said one section in its open position on movement of said carrier from said first position toward said second position and for returning said one section to its closed position on movement of said carrier from said third toward said first position.

4. Apparatus as defined in claim 3, further comprising means for rotating said carrier about a predetermined axis, said unlocking means further comprising follower means articulately connected to and rotatable with said carrier, cam means adjacent to the path of movement of said follower means with said carrier about said axis and arranged to change the position of said follower means with respect to said carrier on movement of said carrier from said first position, and means for opening a container in said compartment in response to said change of position of said follower means.

5. Apparatus as defined in claim 4, wherein said unlocking means further comprises a first lever which is pivotable about said axis and said follower means comprises a second lever pivotally mounted on said first lever.

6. Apparatus as defined in claim 5, wherein said unlocking means further comprises means for engaging and holding said other section of a container in said compartment on movement of said carrier from said first position, said engaging and holding means being mounted on said first lever and said means for moving said one section being mounted on said second lever.

7. Apparatus as defined in claim 6, further comprising means for biasing said engaging and holding means away from the other section of a container in said compartment.

8. Apparatus as defined in claim 6, further comprising means for biasing said moving means away from said one section of a container in said compartment.

9. Apparatus as defined in claim 1, wherein said unlocking means is located between said first and second positions of said carrier when said open end registers with said opening.

10. Apparatus as defined in claim 1, wherein said container comprises sections consisting at least in part of magnetizable material and at least one of said sections is movable relative to the other section between open and closed positions, said unlocking means comprising magnet means provided in said compartment to attract said sections of a container in said compartment and to thus maintain said one section in open position, and further comprising means for locking the container in said compartment during movement of said carrier from said third back to said first position.

* * * * *